Patented July 28, 1931

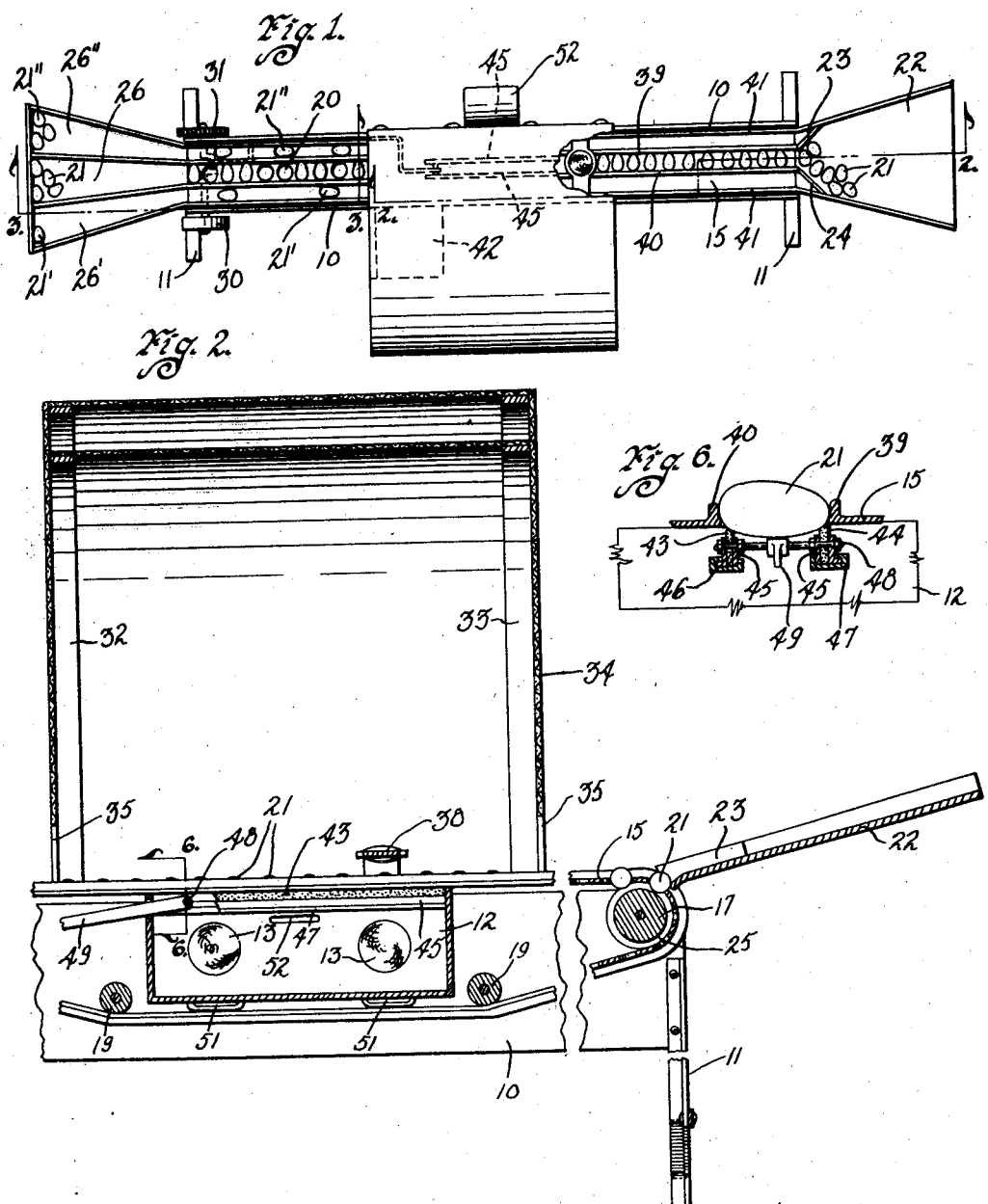

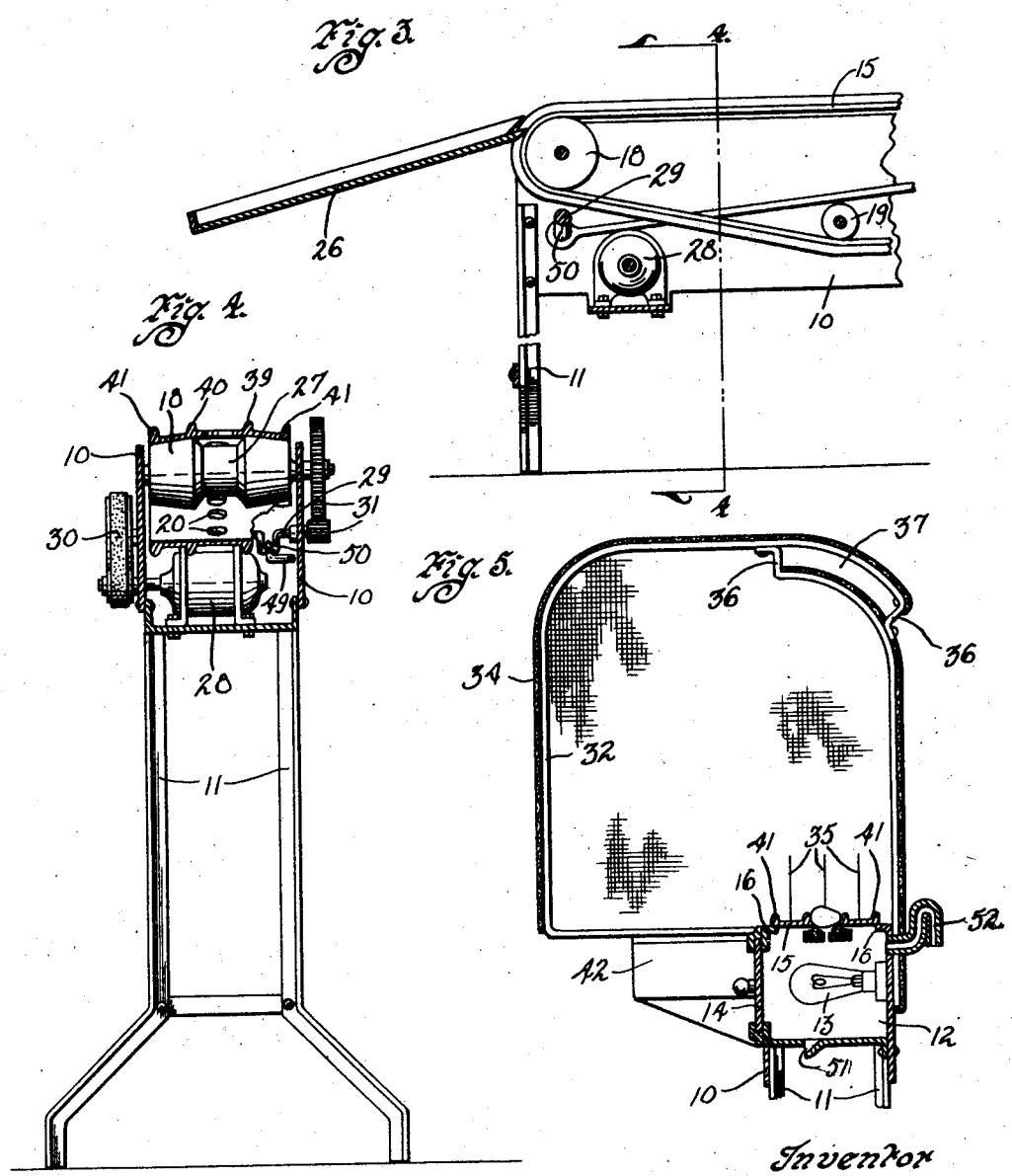

1,816,483

UNITED STATES PATENT OFFICE

ELZA G. HEATON, OF DES MOINES, IOWA

EGG CANDLING AND GRADING MACHINE

Application filed October 1, 1928. Serial No. 309,457.

The object of this invention is to provide an improved construction for a machine for candling and grading eggs by which the eggs are caused to pass before the operator on an endless belt or conveyor.

A further object of the invention is to provide an improved means for causing eggs to automatically assume proper positions successively upon an endless conveyor by which they are conveyed across a candling chamber, said conveyor being formed with spaced apertures providing seats for the eggs and the roller over which the conveyor travels being formed with a peripheral groove in line with said apertures to facilitate the positioning of the eggs therein.

Still another object is to provide improved means for turning the eggs as they pass over the candling chamber and more especially, a power actuated means for imparting a quick reverse movement to the eggs to enable the operator to determine the condition of the contents thereof.

Another and further object of the invention is to provide an improved power operated combined candling and grading machine through the use of which a large number of eggs may be quickly and accurately candled and graded by the operator in a short period of time.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of my improved machine.

Figure 2 is an enlarged longitudinal section through the initial end portion and the candling portion of the machine on the line 2—2 of Figure 1, portions being broken away to economize space.

Figure 3 is an enlarged longitudinal section through the terminal portion of the machine on the line 3—3 of Figure 1.

Figure 4 is a cross section on the line 4—4 of Figure 3, illustrating particularly the driving mechanism for the endless conveyor.

Figure 5 is a cross section through the candling chamber and operator's hood.

Figure 6 is a detail section on the line 6—6 of Figure 2, illustrating particularly the egg rotating means.

I have employed the numeral 10 to designate generally, an elongated frame which is horizontally arranged and supported at a suitable elevation by means of legs 11. In the central portion of the frame 10, I have provided an inclosed candling chamber 12 within which are mounted one or more electric lamps 13 having suitable connections to an electric circuit. The candling chamber 12 is provided with a sliding door 14 in one side and is open at its top.

An endless conveyor 15 preferably composed of a strip of webbing is arranged for travel longitudinally of the frame 10 with its upper run extending across the open top of the candling chamber 12 and substantially closing the same.

The side walls of the chamber 12 may be formed with inwardly extending flanges 16 to support the side margins of the conveyor in its travel thereacross. The endless conveyor 15 extends around and is supported by rollers 17 and 18 suitably journaled at the respective ends of the frame 10 and idler rollers 19 of any desired number may also be journaled in the frame for engaging the lower run of the conveyor.

The conveyor 15 is formed with a plurality of apertures 20 spaced longitudinally of its central portion and these apertures are of sufficient diameter to permit an ordinary sized hen's egg such as 21 to be received therein without falling through the conveyor and yet permitting a portion of the egg to extend through the aperture.

In the accompanying drawing, I have shown the apertures 20 arranged in a single row longitudinally of the conveyor, but it is to be understood that two rows of such apertures or even more may be employed if desired, to increase the capacity of the machine and permit the more rapid travel of the eggs across the candling chamber.

At the initial end of the frame 10 a receiving tray or chute 22 is suitably mounted in a slightly inclined position and with one end directed toward and substantially in the same horizontal plane as the receiving end of the conveyor 15. Eggs such as 21 are placed upon the receiving tray 22 and roll by gravity toward its inner end, which may be restricted in width, as shown in Figure 1.

Inclined guide strips 23 and 24 are placed at the inner end of the receiving chute 22 to guide the eggs 21 toward the central portion of the conveyor and to cause them to successively enter the apertures 20 thereof as the conveyor travels across the inner end of the chute.

To facilitate the passage of the eggs to the conveyor and to assist in their proper positioning in the apertures 20, the roller 17 is formed at its center with a peripheral groove 25 which permits the eggs to project partially through the apertures 20 as the conveyor passes over the roller.

At the terminal end of the machine a delivery tray 26 is suitably supported preferably in slightly inclined position downwardly from the terminal roller 18 which also is provided with a peripheral groove 27 to permit the eggs to pass over the roller just before being discharged into the tray 26.

The endless conveyor 15 may be driven in any desired manner and I have here shown an electric motor 28 mounted in the frame 10 near the terminal end of the machine. The motor 28 is in this instance operatively connected to a counter shaft 29 by means of a belt and pulley driving means 30 and the counter shaft 29 is operatively connected by means of gearing 31 to the shaft of the pulley 18.

In the travel of the conveyor 15 the eggs mounted thereon are caused to pass over the top of the candling chamber 12 which is illuminated by the lamps 13 so that an operator viewing the eggs from above is enabled to determine their condition in a satisfactory manner.

To aid in the effectivenes of the candling operation, I have provided a hood over the candling chamber 12 and adjacent portion of the machine within which the operator's head and shoulders may be positioned and which excludes most of the exterior light. The hood is composed of spaced frame members 32 and 33 arched over and supported by the frame 10 and these frame members carry a suitable fabric covering 34 preferably of dark colored material. The hood is formed with slitted openings 35 at its end to permit the passage of the conveyor 15 and eggs thereon.

As shown in Figures 2 and 5, I have provided offsets 36 in the frame members of the hood and a break in the fabric covering 34 so as to form a shielded ventilating opening 37 to permit the escape of heated and foul air from the hood.

As shown in Figure 5, the hood projects laterally at one side of the frame and is open at its bottom to accommodate the body of the operator.

If desired, a magnifying glass 38 may be supported over the candling chamber and over the conveyor 15 to assist the operator in determining the condition of the eggs in their travel.

As here shown, the conveyor 15 may be formed or provided with spaced parallel ribs 39 and 40 on its surface, which ribs are arranged on opposite sides of the row of apertures 20. The ribs 39 and 40 divide the surface of the conveyor into a plurality of longitudinally extending divisions and similar ribs 41 may also be provided at the outer margins of the conveyor.

The central division or in other words, the space between the ribs 39 and 40 is occupied by the apertures 20 and it is in this central division that the eggs are carried to and across the candling chamber. The other divisions of the conveyor or in other words, the longitudinal spaces between the central division and the outer ribs 41 may be employed for receiving eggs as they are graded by the operator. For instance, eggs such as 21', which the operator has determined should be classed as No. 2 eggs may be lifted by him from their original positions at the central division of the conveyor and placed in one of the outer divisions. In a similar manner, eggs such as 21'' which have been determined by the operator should be classed as No. 3 eggs, may be lifted by him and placed in the outer division, as indicated at the left hand end of Figure 1.

When this method of grading is employed, the receiving tray 26 should be similarly divided into separate compartments to receive the several grades of eggs. For instance, the central delivery tray 26 of the tray will receive the No. 1 eggs or those which have passed inspection and have been permitted to remain in the central division of the conveyor, while the delivery tray 26' at one side will receive the No. 2 eggs and the delivery tray 26'' at the opposite side, will receive the No. 3 eggs and when the eggs are removed from the delivery tray they may be placed in separate containers accordingly. Any eggs which the operator determines to be bad may be removed by him from the conveyor and placed in a suitable receptacle, such as a tray 42 located near the candling chamber.

It will be understood, of course, that in the event a plurality of rows of apertures 20 are employed, the number of ribs on the conveyor may be correspondingly increased as well as the number of compartments of the receiving tray 26.

It is desirable to provide means for causing the eggs 21 to rotate or turn as they pass over the candling chamber in order that the operator may view the contents from several angles and thus determine more accurately, the condition of the eggs.

For this purpose, I have provided spaced parallel strips 43 and 44 of soft rubber, which are fixed to and carried by metallic bars 45 extending longitudinally near the top of the candling chamber. The rubber strips 43 and 44 project upwardly above the bars 45 in such manner as to engage the eggs 21 in their travel and the friction of these members on the eggs is sufficient to cause them to turn in their travel.

In order to increase the efficiency of the turning means it may be desirable to make them longitudinally movable and for this purpose, I have shown the carrying bars 45 slidably mounted in channel tracks 46 and 47 rigidly mounted in the upper part of the candling chamber, as clearly shown in Figure 6. The carrying bars 45 and turning strips 43, 44 are somewhat shorter than the channel tracks 46 and 47 and the bars 45 are connected near one end by a cross rod 48.

A connecting rod 49 pivotally engages the cross rod 48 and extends longitudinally of the machine and pivotally engages at its opposite end, a crank 50 formed in the counter shaft 29.

As the counter shaft 29 is rotated in the operation of the machine, it causes a reciprocation of the carrier bars 45 and turning strips 43 and 44 in the channel tracks and this action imparts a quick reverse movement to the eggs which are then in engagement with the turning strips. This quick movement of the eggs assists the operator in determining their condition because he can accurately determine whether or not the yolk has adhered to the shell so that it should be classed as a No. 3 egg.

In other words, this movement of the egg causes or should cause a movement of its contents, which will reveal the method of classing and grading the eggs.

It is apparent that I have provided a convenient and relatively inexpensive machine which is capable of handling a large number of eggs in a short period of time and which is so arranged as to enable the operator to quickly and accurately candle and grade the eggs as they pass before him.

By the use of this machine, the expense and time required for candling and grading eggs is greatly reduced and it is possible to perform the operation quickly and in an efficient and accurate manner.

The candling chamber 12 is provided with suitable ventilating means including slitted openings 51 in its bottom and outwardly and downwardly directed ducts 52 in its side wall.

I claim as my invention:

1. An egg candling and grading machine comprising a frame, an illuminated candling chamber open at its top, a conveyor having a part arranged to travel over said chamber, said conveyor being formed with a row of spaced egg-receiving apertures, and a pair of spaced strips extending longitudinally of said candling chamber below said conveyor for frictionally engaging the downwardly projecting portions of the eggs passing over said chamber, and means for reciprocating said strips to impart a reverse rotation to the eggs.

2. An egg candling and grading machine comprising a frame, an illuminated candling chamber open at its top, a conveyor having a part arranged to travel over said chamber, said conveyor being formed with a row of spaced egg-receiving apertures, means for driving said conveyor, a turning member extending longitudinally of the candling chamber and arranged for frictional engagement with the eggs on said conveyor, and means connected with said driving means for reciprocating said turning member.

3. An egg candling and grading machine comprising a frame, an illuminated candling chamber open at its top, a conveyor having a part arranged to travel over said chamber, said conveyor being formed with a row of spaced egg-receiving apertures, driving means for said conveyor including a shaft having a crank, a turning member slidably mounted in said candling chamber and arranged to frictionally engage the eggs on said conveyor, and a connecting rod pivotally connecting the crank of said shaft to said turning member for reciprocating the latter, whereby each egg is alternately rolled in opposite directions during its travel.

Des Moines, Iowa, September 21, 1928.
ELZA G. HEATON.